United States Patent [19]

Powell

[11] Patent Number: 5,068,928
[45] Date of Patent: Dec. 3, 1991

[54] POOL COVER STORAGE APPARATUS

[76] Inventor: Cynthia Powell, 2515 Willard, Saginaw, Mich. 48602

[21] Appl. No.: 559,821

[22] Filed: Jul. 30, 1990

[51] Int. Cl.$^5$ ............................................. E04H 3/19
[52] U.S. Cl. ............................................. 4/500; 4/496; 4/503; 248/231.8; 24/457
[58] Field of Search ................. 4/496, 498, 500, 502, 4/503, 499; 211/60.1; 248/215, 303, 339, 231.8, 316.7, 74.2, 72; 24/457, 339

[56]  References Cited
U.S. PATENT DOCUMENTS

| Re. 30,774 | 10/1981 | Dahlbeck et al. | 4/498 |
| 2,346,276 | 4/1944 | Reittinger | 248/215 |
| 2,808,845 | 10/1957 | Wood | 135/101 |
| 3,193,229 | 7/1965 | Stock | 248/74.2 |
| 3,344,440 | 10/1967 | Langer | 4/503 |
| 3,391,410 | 7/1968 | Melberg | 4/503 |
| 3,536,287 | 10/1970 | Kramer | 248/215 |
| 3,608,099 | 9/1971 | Wall | 4/499 |
| 3,707,007 | 12/1972 | Trostler | 4/500 |
| 3,854,149 | 12/1974 | Mischke | 4/500 |
| 4,234,973 | 11/1980 | Vetter et al. | 4/500 |
| 4,606,521 | 8/1986 | Williams | 248/316.7 X |
| 4,942,989 | 7/1990 | Miller | 224/42.46 R |

FOREIGN PATENT DOCUMENTS 2214799 9/1989 United Kingdom ........... 4/498

Primary Examiner—Henry J. Recla
Assistant Examiner—Glenn T. Barrett
Attorney, Agent, or Firm—John J. Swartz

[57] ABSTRACT

Apparatus for storing a rolled pool cover along the exterior sidewall of the pool. The apparatus includes a plurality of perimetrically spaced apart, upwardly opening hooks which are cantileverly supported on the pool sidewall. The hooks are expansible and contractible to allow the hooks to "open" and "close" for receiving and dispensing the pool cover.

10 Claims, 1 Drawing Sheet

U.S. Patent
Dec. 3, 1991
5,068,928
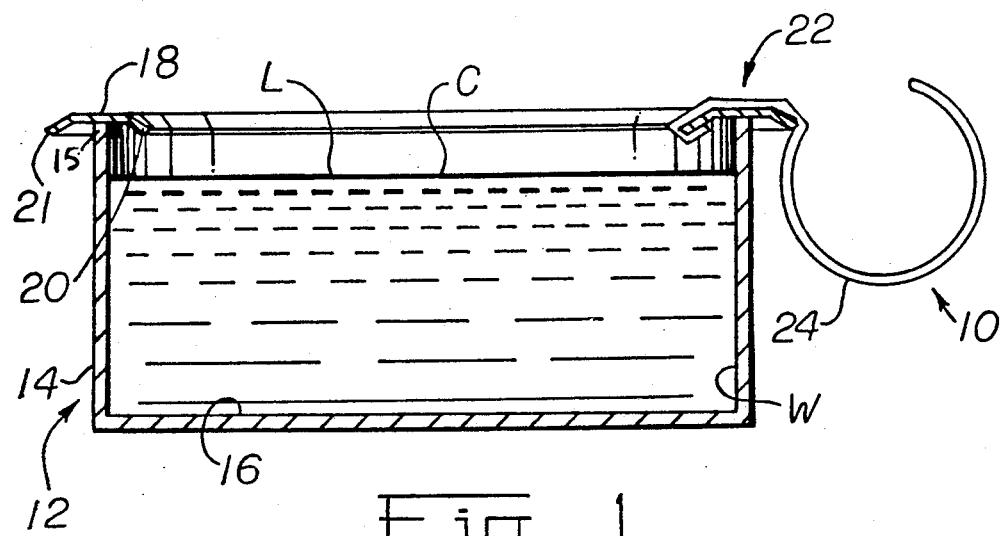
Fig. 1
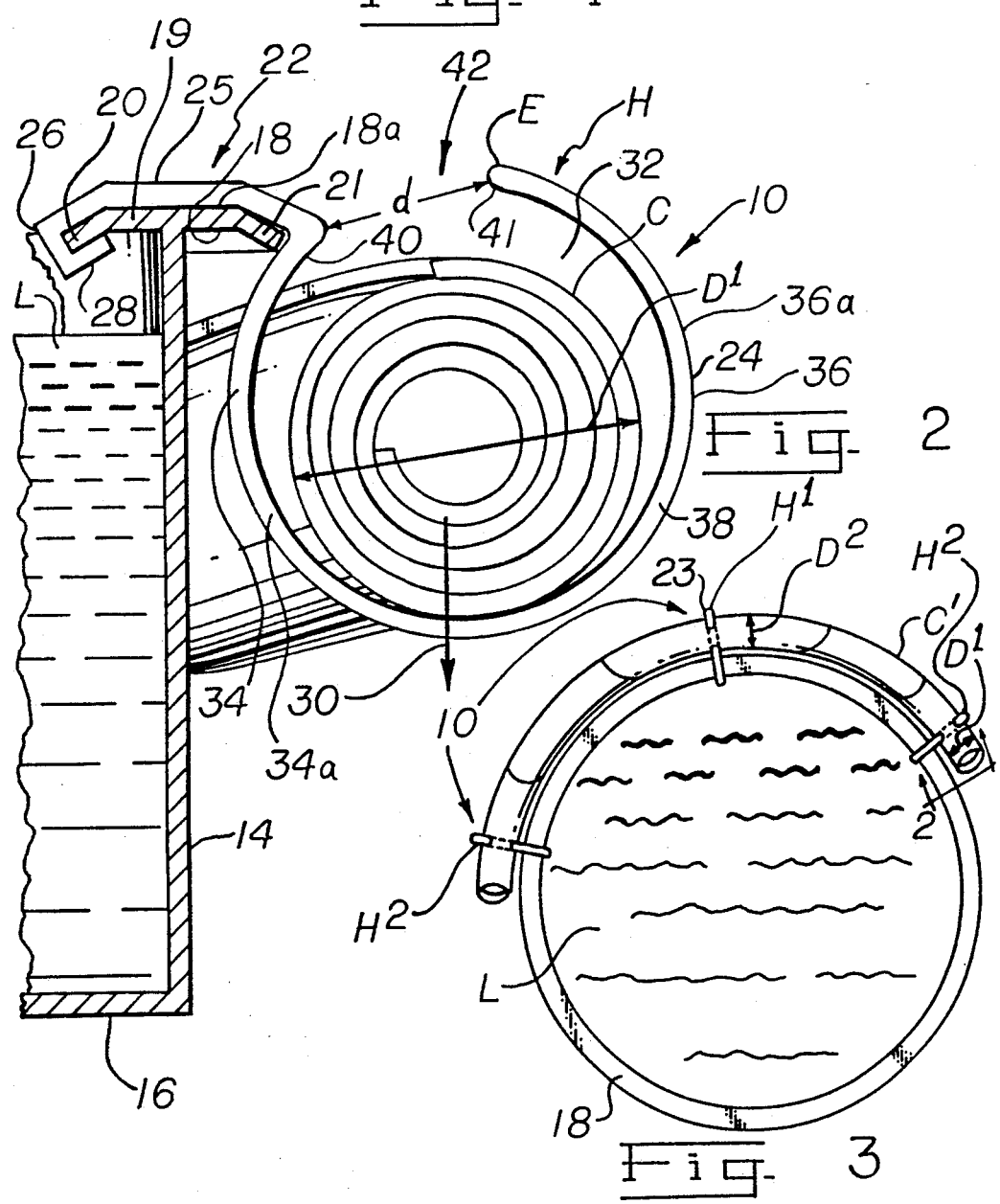
Fig. 2
Fig. 3

POOL COVER STORAGE APPARATUS

BACKGROUND OF THE INVENTION

1. Field of the Invention

This invention relates to swimming pools and more particularly to apparatus for storing a pool cover when it is removed from an above-ground swimming pool.

2. Description of the Prior Art and Objects

Swimming pools, when not in use, are typically covered by a removable cover for precluding dirt, leaves, etc., from entering the pool water. Such covers sometimes include solar devices for converting light energy to heat energy to heat the pool water.

Under-ground pools typically have a side wall which is under-ground and joined at the top outer edge thereof by a concrete apron, perimetrically extending about the pool, on which a pool cover is stored when not used to cover the pool. Under-ground pools frequently include a window shade roller type structure, which lies up the pool cover along the side of the pool, for rolling the cover.

Above-ground pools have a side wall which is substantially, if not totally, above ground. Above-ground pools frequently do not have the luxury of an apron and are frequently placed in a setting which includes lawn and grass immediately adjacent the exterior wall of the pool. If the removed pool cover is merely set on the grass, leaves, grass clippings, and other foreign matter will tend to cling to the cover. When the cover is returned to a position covering the pool, the foreign matter will enter the pool water.

Accordingly, it is an object of the present invention to provide a new and novel apparatus for storing a pool cover which is removed from a pool covering position.

It is another object of the present invention to provide a new and novel apparatus for storing a swimming pool cover which is removed from an above-ground pool.

Above-ground pools typically include a circular side wall, and thus the cover also normally has a circular or oval shape. When a round or oval pool cover is removed and rolled into a roll, the mid-portion of the roll will have a substantially greater diameter than will the end-portions of the roll. Accordingly, it is an object of the present invention to provide new and novel apparatus for storing a circular pool cover.

It is another object of the present invention to provide apparatus for storing a pool cover which includes a plurality of circumferentially spaced apart cover supporting members which are mounted on the exterior wall of an above-ground circular pool.

A further object of the present invention is to provide apparatus for storing a pool cover including a plurality of perimetrically spaced apart pool cover storage hooks including mechanism for cantileverly supporting the hooks on the wall of the pool.

Another object of the present invention is to provide apparatus for storing a pool cover of the type described which includes a plurality of hooks each including a generally u-shaped cover receiving portion.

Still another object of the present invention is to provide apparatus for storing a pool cover of the type described wherein the u-shaped cover receiving portion includes inner and outer legs which are relatively moveable toward and away from each other for receiving and storing the rolled pool cover.

It is a further object of the present invention to provide pool cover storage apparatus of the type described including a plurality of circumferentially spaced apart hooks which are self-supporting on the side wall of the pool and can be easily removed from the side wall.

Other objects and advantages of the present invention will become apparent to those of ordinary skill in the art as the description thereof proceeds.

SUMMARY OF THE INVENTION

Apparatus for storing a pool cover, which can be removed from a swimming pool, including a plurality of spaced apart pool storage hooks each of which includes a generally u-shaped cover receiving portion and an inner mounting portion for cantileverly mounting the u-shaped portion on the exterior side of a pool wall.

DESCRIPTION OF THE DRAWINGS

The invention may be more readily understood by referring to the accompanying drawings, in which:

FIG. 1 is a sectional side view of a pool which mounts pool cover storage apparatus constructed according to the present invention, a pool cover for covering the pool being schematically illustrated in chain lines;

FIG. 2 is a greatly enlarged, sectional side view illustrating the pool cover in a stowed position supported by the pool cover storage apparatus constructed according to the present invention, taken along the line 2—2 of FIG. 3; and FIG. 3 is a slightly decreased top plan view of pool mounting apparatus constructed according to the present invention, illustrating the pool cover in a stowed position received by the apparatus constructed according to the present invention.

DESCRIPTION OF THE PREFERRED EMBODIMENT

Apparatus constructed according to the present invention, generally designated 10, is particularly adapted for use with an above-ground, circular pool, generally designated 12. The pool includes a circular annular side wall 14 joined to an integral bottom wall 16. The pool is filled with water to a level L.

The upper terminal end 15 of the side wall 14 mounts an annular cap 18 having a circular, horizontal mid-section 19 integrally provided with oppositely downwardly inclined, inner and outer circumferentially extending annular flanges 20 and 21.

The pool 12, when not in use, is covered by a solar or dirt cover C which floats on the surface of the water, as illustrated in FIG. 1 to keep dirt, leaves, debris and other airborne foreign matter from entering the pool water W. The cover C may comprise lightweight plastic or other pliable, durable material which incorporates solar cells for converting the ambient light energy to heat energy which is entrapped under the cover C to heat the pool water W.

The apparatus 10, constructed according to the present invention, comprises a plurality of circumferentially spaced apart, pool cover supporting hooks, each generally designated H. The hooks H include a central hook H1 and a pair of circumferentially spaced end hooks H2. Each hook H comprises a strip 23 of yieldable material, such as plastic, including a mounting end, generally designated 24. The mounting end 22 cantileverly supports the hook H on the upper pool wall cap 18 and includes a portion 25 overlying the cap 18 and a u-shaped, inner, terminal end member 26 having a terminal flange 28 underlying the inner cap flange 20. The u-shaped end member 28 is folded on itself to define a slot which receives the flange 20.

The pool cover supporting portions 24 are each generally U-shaped, as viewed in FIG. 2, and include inner and outer curvilinear legs, generally designated 34 and 36 integrally coupled at their lower ends by a curvilinear base 38. The upper end portions 40 and 41 of legs 34 and 36 respectively are spaced apart a distance d to provide an upwardly opening receptacle or window, generally designated 42, for receiving the cover C when it is rolled and removed from the, operative pool covering position illustrated in FIG. 1 to the stowed position illustrated in FIGS. 2 and 3.

As illustrated, the distance between the lower portions 34a and 36a of the legs 34 and 36 is substantially greater than the distance d between the upper end portions 40 and 41 of legs 34 and 36. The material comprising the strips 21 is yieldable to allow the terminal end E of the outer leg 36 to move outwardly to the expanded, cover receiving position, illustrated in chain lines in FIG. 2, and permit the rolled cover C' to pass through the gap between the upper leg ends 40 and 41. As illustrated, the diameter D1 of the opposite ends 44 of cover C' is greater than the distance d between the upper leg ends 40 and 41.

As also illustrated in FIG. 3, the diameter D2 of the centermost portion of the rolled cover C' is greater than the diameter D1 of the ends of the rolled cover C'. Accordingly, the centralmost hook H1 will be somewhat larger than the endmost hooks H2, as illustrated in FIG. 3, so that it can accommodate the larger diameter central rolled portion D2. In the hook H1, the distance D and d of central hook H1 will be greater than the distances D and d, respectively, of the end hooks H2. The size of the eyelet or openings 32 defined by the legs 34, 36 and base 38 will be larger for the central hook H1 than for the outer two end hooks H2.

The inner hook mounting end portions 22 thus cantileverly support the u-shaped hook portions 24 on the side wall 14 of the pool.

When it is desired to unroll the rolled pool cover C' and replace it atop the pool 12, the rolled pool cover C' is again moved upwardly from the position illustrated in FIG. 2 to force the terminal hook end E to the position illustrated in chain lines in FIG. 2.

When the pool cover C' is rolled and supported by the hooks H, the pool cover C will force the hooks downwardly, in the direction of the arrow 30, causing the u-shaped member 26 to swing clockwise as illustrated in FIG. 2. This will force the terminal flange 28 upwardly against the underside of wall flange 20 to hold the hooks H in position.

If desired, a circumferentially extending netting (not shown) can span the various hooks H to underlie the cover C and hold skimmers and other pool accessories.

For winterizing the pool, the rolled cover C' is removed and the hooks H are also removed from the pool wall cap 18 by merely swinging each of the hooks H upwardly to the left, from the position illustrated in FIG. 2, and moving then radially inwardly until the terminal end portions 28 inwardly clears the wall cap flange 20. A winter cover, not shown, then covers the entire pool.

THE OPERATION

When it is desired to remove the cover C from the position illustrated in chain lines in FIG. 1, the cover C is rolled and the pool storage hooks H are mounted on the pool side wall 14 in the positions illustrated in FIGS. 2 and 3. The rolled pool cover C' is then bent or otherwise forced into an arcuate shape, as illustrated in FIG. 3, and dropped into the receptacles 32 defined by the arcuately arranged u-shaped hooks H.

When the rolled pool cover C' is moved toward the stowed position illustrated in FIGS. 2 and 3, it will force the legs 36 outwardly to the positions illustrated in chain lines in FIG. 2 until the cover C' passes. When the rolled pool cover C is finally received in the position illustrated in FIG. 2, the yieldable material will again allow the legs 36 to return to the positions illustrated in solid lines in FIG. 2.

When it is desired to replace the pool cover to the unrolled condition illustrated at C in FIG. 1, the cover C' is merely moved upwardly to again force the legs 36 outwardly to the position illustrated in chain lines in FIG. 2.

For permanent winterizing, the hooks H can then be quickly removed from the positions illustrated in the drawing by merely swinging the hooks H upwardly from the positions illustrated in FIG. 1 and then moving the entire hook radially inwardly until the terminal end portions 28 inwardly clear the flange 20.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. Apparatus for storing a rolled pool cover which is removed from a position covering a swimming pool having a perimetrically extending side wall to a position along a exterior side of said side wall, said side wall including an upper terminal end having inner and outer edge portions, said apparatus including:

a plurality of perimetrically spaced apart pool cover storage hooks for receiving perimetrically spaced portions of said pool cover when said cover is removed from said pool, each of said hooks including a generally u-shaped, upwardly opening cover receiving portion, defining a cover receiving window, including upstanding inner and outer legs having lower ends spanned by an integral base and upper ends which are spaced apart to provide an upwardly opening receptacle for freely receiving a portion of said pool storage cover; and an inner mounting portion having an outer end coupled to said upper end of said inner leg for cantileverly mounting said u-shaped cover receiving portion on the exterior side of said exterior pool wall;

said inner mounting portion including an inner terminal portion bent upon itself for coupling to said inner edge portion of said upper terminal end of said pool side wall.

2. The apparatus set forth in claim 1 wherein said upper ends of said legs are spaced apart a predetermined distance and said lower ends of said legs are spaced apart a greater predetermined distance.

3. The apparatus set forth in claim 2 wherein said base comprises yieldable material for urging said outer leg to a position in which said upper ends of each hook are spaced apart said predetermined distance but allowing said upper end of said outer leg to be moved outwardly so that said upper ends of the legs of each hook are spaced a greater predetermined distance to receive said pool cover.

4. The apparatus set forth in claim 1 wherein said u-shaped cover receiving portion comprises yieldable material normally urging said legs to position in which the upper ends of said legs are spaced apart a predetermined distance less than the spacing between said lower ends of said legs but allowing relative movement of said upper ends of said legs away from each other for receiving said pool cover.

5. The apparatus set forth in claim 4 wherein said inner mounting portion comprises a down-turned terminal end portion bent over on itself for underlying said inner edge portion of said upper terminal end of said pool.

6. The apparatus set forth in claim 1 wherein the size of the window of at least one of said hooks is larger than the size of the windows if at least one of the other of said hooks.

7. The apparatus set forth in claim 6 wherein the distance between the lower ends of said legs at least one of said hooks is greater than the distance between the lower ends of said legs of at least another one of said hooks.

8. The apparatus set forth in claim 1 wherein said inner leg includes an intermediate portion between said upper and lower portions thereof extending inwardly of said outer end of said inner mounting portion.

9. In combination with an above-ground, generally circular swimming pool, having an annular side wall provided with an exterior and interior surface and a pool cover removably mounted on the pool, apparatus for storing a pool cover which is removed from a position covering the side wall to a position along said exterior surface of said side wall, said side wall including an upper terminal end having inner and outer edge portions, said apparatus comprising:

upwardly opening pool cover storage hook means having inner and outer legs spanned by a base and having upper ends which are spaced apart to provide an upwardly opening receptacle for freely receiving said pool cover; and cantilever mounting means, mounted to said upper end of said inner leg, for coupling to said inner edge portion of said upper terminal end of said side wall for cantileverly supporting said pool cover adjacent the outer edge portion of said side wall;

said upwardly opening storage hook means including a strip bent upon itself to provide an upwardly opening receptacle for receiving said pool cover, said cantilever mounting means including an integral inner strip having a portion for resting on said upper terminal end of said side wall and an inner terminal end portion bent upon itself for receiving said inner edge portion.

10. The apparatus set forth in claim 9 wherein said strip comprises yieldable material which urges the terminal end of said strip to a position spaced a predetermined distance from said integral inner strip but allowing said terminal end to move outwardly to a cover receiving position.

* * * * *